United States Patent
Taaghol et al.

(10) Patent No.: US 8,078,171 B2
(45) Date of Patent: Dec. 13, 2011

(54) HANDOFF OF A MOBILE STATION FROM A FIRST TO A SECOND TYPE OF WIRELESS NETWORK

(75) Inventors: Pouya Taaghol, San Jose, CA (US); Vivek Gupta, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 947 days.

(21) Appl. No.: 11/764,017

(22) Filed: Jun. 15, 2007

(65) Prior Publication Data

US 2008/0311909 A1  Dec. 18, 2008

(51) Int. Cl.
*H04W 36/00* (2009.01)
*H04W 4/00* (2009.01)

(52) U.S. Cl. .................. 455/436; 370/338; 370/331

(58) Field of Classification Search ............... 370/338, 370/331; 455/436, 456.1
See application file for complete search history.

(56) References Cited

U.S. PATENT DOCUMENTS

| | | | |
|---|---|---|---|
| 7,224,977 B2 | 5/2007 | Cavalli et al. | |
| 2003/0119550 A1* | 6/2003 | Rinne et al. | 455/553 |
| 2005/0221824 A1 | 10/2005 | Lee et al. | |
| 2007/0076664 A1* | 4/2007 | An et al. | 370/331 |
| 2007/0110009 A1* | 5/2007 | Bachmann et al. | 370/338 |
| 2007/0160049 A1* | 7/2007 | Xie et al. | 370/390 |
| 2007/0213059 A1* | 9/2007 | Shaheen | 455/436 |
| 2008/0064402 A1* | 3/2008 | Oh | 455/436 |
| 2008/0095087 A1* | 4/2008 | Ahmavaara | 370/310 |
| 2008/0096560 A1* | 4/2008 | Felske et al. | 455/436 |
| 2008/0125126 A1* | 5/2008 | Fang et al. | 455/436 |

FOREIGN PATENT DOCUMENTS

| | | |
|---|---|---|
| GB | 2378090 A | 1/2003 |
| WO | 2007/011983 A1 | 1/2007 |

OTHER PUBLICATIONS

Rajavelsamy et al., "A Novel Method for Authentication Optimization during Handover in Heterogeneous Wireless Networks", In Proc of the 2nd IEEE International Conference on Communication System Software and Middleware, COMSWARE, Bangalore, India, Jan. 2007.*

Abdul Hasib et al., "Performance Analysis of Common Radio Resource Management Scheme in Multi-Service Heterogeneous Wireless Networks."; Wireless Communications and Networking Conference, 2007. WCNC 2007, IEEE, Mar. 11-15, 2007, pp. 3298-3302.

Japanese Office action for JP2010-512293, mailed Jun. 21, 2011.

* cited by examiner

*Primary Examiner* — Jinsong Hu
*Assistant Examiner* — Opiribo Georgewill
(74) *Attorney, Agent, or Firm* — Schwabe, Williamson & Wyatt, P.C.

(57) ABSTRACT

Methods and apparatus for moving or transferring a mobile station from one type of wireless network to another type of wireless network are described herein. The methods may include employing a source radio access technology (RAT) device, a target RAT device, and a cross wireless network type inter-RAT server to collaboratively communicate with each other to move the mobile station between the different types of wireless networks.

8 Claims, 5 Drawing Sheets

100

110

HANDOFF OF A MOBILE STATION FROM A FIRST TO A SECOND TYPE OF WIRELESS NETWORK

TECHNICAL FIELD

Embodiments of the present invention relate to the field of wireless communication, more specifically, to methods and apparatuses for transferring a mobile station between different types of wireless networks.

BACKGROUND

As wireless communication technology evolves, wireless networks employing different radio access technology (RAT) are becoming more and more available to the general public. Examples of RAT include, for instance, wireless fidelity (WiFi), Worldwide Interoperability for Microwave Access (WiMAX), Global System for Mobile Communication (GSM), 2G/3G, Code Division Multiple Access (CDMA), and so forth. These RATs may serve different deployment types and environments. For example, WiFi has shown to be a great technology for indoor operation whereas cellular technologies such as 2G/3G and WiMAX operate best in licensed spectrum covering large outdoor environments. It is also expected that multi-mode devices that can operate in different RAT environments will become widespread in the near future.

In order for a mobile device (herein a "mobile station") to seamlessly move from one type of RAT network to a second type of RAT network, several solutions have been suggested. Currently proposed solutions have focused on pure layer three (L3) mobility solutions such as Mobile Internet Protocol (IP). Although these technologies may provide inter-access mobility solutions, the handoff delay associated with these solutions may be extremely high. Furthermore, such L3 mobility procedures rely completely on the mobile device to make a handoff decision, which may be less than ideal. That is, it may be more advantageous, at least in some instances, for the wireless networks to make the handoff decision.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
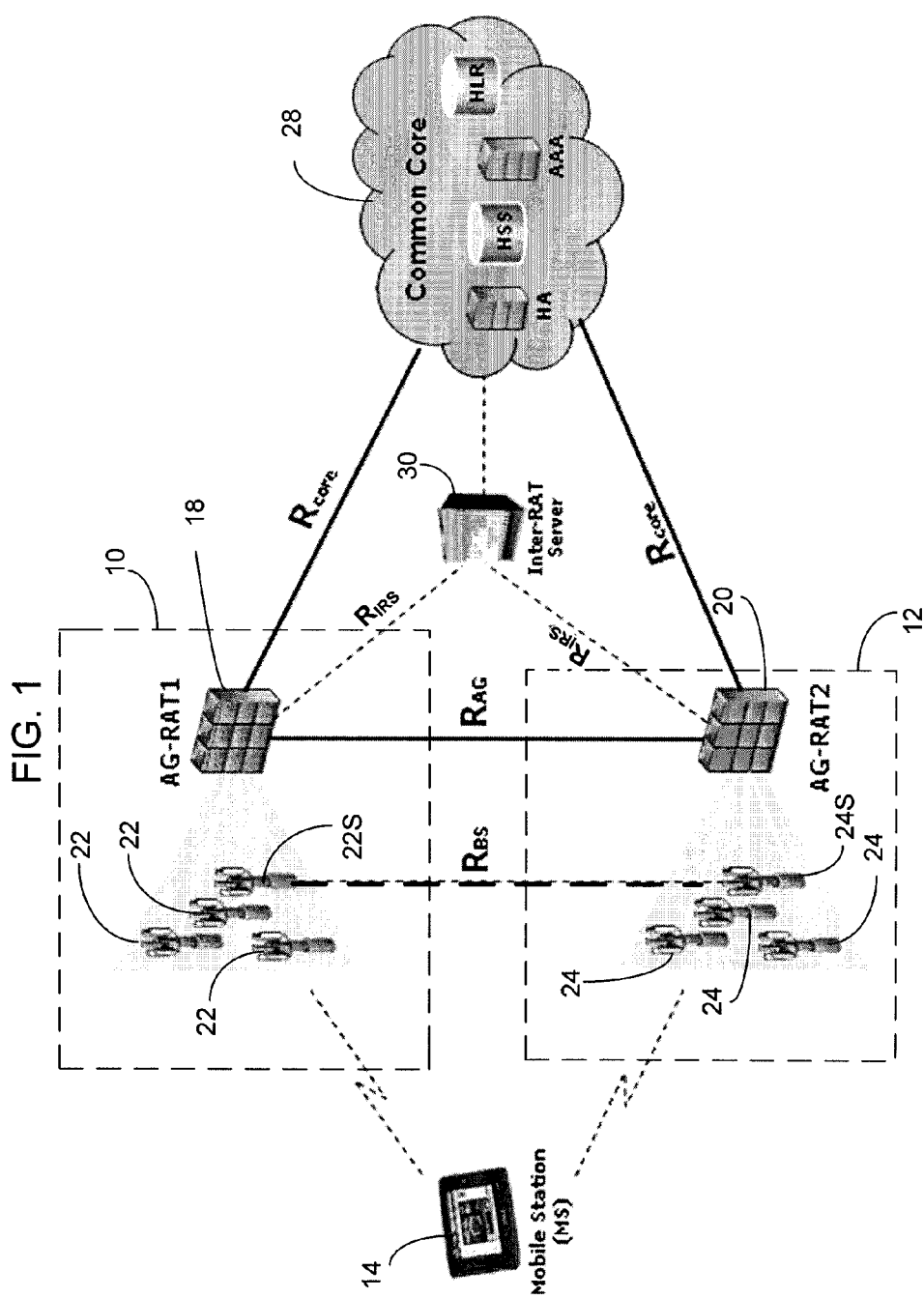
FIG. 1 illustrates a mobile station and two wireless networks, in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiment of the present invention, apparatuses and methods are provided that allow a mobile station to seamlessly move (i.e., transfer or switch) from a second wireless network of a second type of wireless network to a first wireless network of a first type of wireless network without significant handoff delays. For purposes of this description, the second wireless network may be referred to as the "source" network while the first wireless network may be referred to as a "target" network. For the embodiments, the first and the second wireless network type being of different network types. For example, the first wireless network type may be a type of network associated with a first radio access technology (RAT), while the second wireless network type may be a type of network associated with a second RAT.

Some embodiments of the present invention may employ multiple devices to collaboratively move the MS from the first wireless network to the second wireless network. For these embodiments, a first RAT device associated with the first wireless network, a second RAT device associated with the second wireless network, and a cross wireless network type inter-RAT server that is communicatively coupled with the first and the second RAT devices may be employed. In some instances, the first and the second RAT devices may be access gateways (AGs) of the first and second wireless networks or base stations (BSs) of the first and second wireless networks. These and other aspects of various embodiments of the present invention will be described in greater detail herein.

FIG. 1 illustrates a mobile station and two wireless networks, in accordance with various embodiments of the present invention. The first wireless network 10 may be associated with a first wireless network type (RAT1) while the second wireless network 12 may be associated with a second wireless network type (RAT2). Both of the wireless networks 10 and 12 may interface with a common core 28 that comprises an HA (home agent), an HSS (home subscription server), an AAA (authentication, authorization, and accounting) server, and an HLR (home location register). The MS 14 may be any one of a variety of computing or communication devices including, for example, a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and so forth.

As depicted, the first wireless network 10 includes multiple RAT devices including a first access gateway (AG-RAT1 or simply "AG") 18 and a plurality of base stations (BSs) 22, the first AG 18 being in wireless communication with the plurality of the BSs 22. Similarly, the second wireless network 12 includes multiple RAT devices including a second access gateway (AG-RAT2 or simply "AG") 20 that is in wireless communication with a plurality of BSs 24. As further depicted, a cross wireless network type inter-RAT server (herein "inter-RAT server" or simply "IRS") 30 is in wireless and/or wired communication with the common core 28 and the two wireless networks 10 and 12 via the first and the second AGs 18 and 20. Although not depicted, each of the wireless networks 10 and 12 may include additional AGs and BSs but are not depicted for ease of illustration and clarity.

The IRS 30, in brief, may provide a number of functions that may facilitate the MS 14 to move, for example, from the second wireless network 12 (i.e., the "source" network) to the first wireless network 10 (i.e., the "target" network). For example, the inter-RAT server 30 may store, maintain, and/or process the latest or current information relating to the MS 14 as well as the target wireless network (i.e., first wireless network 10) that may be needed in order to facilitate the transfer of MS 14 from the second wireless network 12 to the first wireless network 10. Such information may include, for example, current context information of the MS 14 (or simply "current context" of the MS 14), information relating to the target wireless network (i.e., first wireless network 10) including information associated with the target RAT device (first AG 18) that may identify the target RAT device, and current radio measurements of the MS 14. Other functions that may be performed by the inter-RAT server 30 includes, for example, quality of service (QoS) mapping and translation across heterogeneous RAT networks, BS-ID (base station identification) of a certain RAT mapping to BS-IP (base station internet protocol) address and/or AG-IP address, authorization and admission of an inter-RAT exchange, inter-RAT measurement report aggregation per MS, network assisted inter-RAT handoff decision making, identifying the serving AAA server that hold MS context, inter-RAT/system security key generation and retrieval for the serving AAA server, and per-RAT handoff triggers and thresholds.

The several $R_{xx}$ depicted in FIG. 1 represent the different interfaces between the various network components. For example, $R_{core}$ between the first AG 18 and the common core 28 represents the interface between the first AG 18 and the common core 28. Note that in this illustration, the interface $R_{AG}$ between the first AG 18 of the first wireless network 10 and the second AG 20 of the second wireless network 12 is a generic interface, which will be described in greater detail below. Similarly, the interface between one of the base stations (i.e., BS 24S) of the second wireless network 12, which may be the serving BS for the MS 14 if the MS 14 is connected to the second wireless network 12, and a corresponding base station (i.e., BS 22S) in the first wireless network 10 may be a generic interface ($R_{BS}$). As will be further described, these generic interfaces (i.e., $R_{AG}$ and $R_{BS}$) may facilitate the rapid handoff of the MS 14 from the second wireless network 12 to the first wireless network 10 in accordance with various embodiments of the present invention.

To facilitate an understanding of various aspects of various embodiments of the present invention, the following introductory example is provided to describe how the MS 14 may move from the second wireless network 12 (i.e., source network) to the first wireless network 10 (target network) in accordance with various embodiments of the present invention, the first and second wireless network 10 and 12 being different types of wireless networks. When the MS 14 initially connects to the second wireless network 12, the IRS 30 may begin to store and maintain certain information associated with the MS 14. Such information to be stored may include, for example, MS context information including security information such as security keys, authentication and authorization information, radio measurements of the MS 14, and so forth.

At any given moment in time and while the MS 14 is connected or linked to the second wireless network 12, at least one of the BSs 24 of the second wireless network 12 may be the serving BS (i.e., BS 24S) that provide service to the MS 14 and at least one of the AGs of the second wireless network 12 (recall that although not depicted in FIG. 1, multiple AGs may be included in the second wireless network 12) may be the servicing AG (i.e., AG 20). While connected to the second wireless network 12, the MS 14, as well as various other devices associated with the second wireless network 12 may provide to the IRS 30 updates of information associated with the MS 14 maintained by the IRS 30.

In some embodiments of the present invention and as will be described below, the IRS 30 may process the current context of the MS 14 and/or radio measurements of the MS 14 to make certain decisions such as whether to automatically move the MS 14 from the second wireless network 12 to the first wireless network 10. For example, if the IRS 30 determines that the radio measurements or at least the updates to the radio measurements indicate that the first wireless network 10 may provide better wireless connection service than the second wireless network 12, then the IRS 30 may initiate certain actions that may eventually result in the MS 14 moving to the first wireless network 10 as will be described in greater detail below.

In any event, a handoff procedure to move the MS 14 from the second wireless network 12 (i.e., the source network) to the first wireless network 10 (i.e., target network) may be initiated when the serving AG 20 receives a handoff request that requests to move the servicing of the MS 14 from the second wireless network 12, the source network, to the first wireless network 10, the target network. The handoff request received by the "source" AG 20 may be from the MS 14 itself, the IRS 30 as previously alluded to, or from elsewhere.

After receiving the handoff request, the source AG 20 may retrieve from the IRS 30 current context information of the MS 14 and information relating to the target wireless network (i.e., first wireless network 10), which may include information relating to and that identifies (among the several AGs that may be located in the target wireless network) the target AG 18. In some embodiments, however, the actual identity of the target AG 18 may be determined by the source AG 20 rather than the IRS 30 if the IRS 30 provides to the source AG 20 the information that may be needed in order to make such a determination. Such information may include, for example the current radio measurements of the MS 14.

Once the source AG 20 has identified the target AG 18, based either on an identification made by the IRS 30 or based on its own determination using information provided by the IRS 30, the source AG 20 may contact the target AG 18 to exchange certain information with the target AG 18 to facilitate the handoff of the MS 14 from the source AG 20 of the second wireless network 12 to the target AG 18 of the first wireless network 10. In various embodiments of the present invention, the source AG 20 may provide to the target AG 18, at least the current context of the MS 14. In various embodiments, the current context of the MS 14 provided by the source AG 20 to the target AG 18 may advantageously result in a layer one and/or two fast attachment of the MS 14 to the target AG 18 without any unnecessary and/or significant delays.

In the above example, the source RAT device of the source second wireless network 12 is AG 20 while the target RAT device of the target first wireless network 10 is AG 18. As described above, these RAT devices may work cooperatively together to move the MS 14 from the second wireless network 12 to the first wireless network 10. In alternative embodiments, however, the serving base station (BS 24S) of the second wireless network 12 may be the source RAT device and a corresponding base station (BS 22S) of the first wireless network 10 may be the target RAT device. For these embodiments, the base stations 22S and 24S, similar to the AGs 18 and 20 described above, may work together in a similar cooperative manner to move the MS 14 from the second wireless network 12 to the first wireless network 10 as will be described below.

As previously indicated, the interface $R_{AG}$ between the source AG 20 and target AG 18 may be a generic interface that allows one RAT device (i.e., AG 20) of one type of wireless network to communicate with another RAT device (i.e., AG 18) of another type of wireless network. The $R_{AG}$ may hide the topology of each wireless networks (i.e., the source and the target networks) from each other. This may be advantageous since operators of a wireless network generally would like the topology of the wireless network kept secret from another wireless network.

Examples of functions that may be performed through the generic $R_{AG}$ interface include MS context (including security context) request/transfer, inter-RAT handoff request/response/preparation, data path anchoring, and layer three (L3) mobility establishment and anchoring, all of which will be described in greater detail below. In contrast, in embodiments in which the base stations of the wireless networks (i.e., BS 22S and BS24S of FIG. 1) are the source and target RAT devices, the functions that may be performed through the generic interface $R_{BS}$ between the source BS 24S and the target BS 24S includes, for example, layer two (L2) security context transfer and radio resource management messages about the spare capacity, overload situation, and per MS measurement request/response.

The two generic interfaces $R_{BS}$ and $R_{AG}$ may allow the source and target RAT devices (i.e., either AGs or BSs) to exchange information that may be used to facilitate the MS 14 to move or handoff from the second wireless network 12 to the first wireless network 10. For example, and as previously alluded to, the source RAT device (i.e., AG 20 or BS 24S) may send to the target RAT device (i.e., AG 18 or BS 22S) current context of the MS 14 as well as information associated with the target network (i.e., first wireless network 10).

The current context of the MS 14 to be exchanged between the source and target RAT devices may include various information relating to the MS 14 such as the MS-ID in the source network (i.e., identification of MS 14 in the second wireless network 12) and the MS-ID in the target network. The current MS context to be exchanged may further include security information such as master security keys. For example, layer two (L2) security context including, for example, WiMAX L2 security parameters that are: MSK (Master Session Key), 512-bit, known to the AAA, the authenticator, and the MS and derived from extensible authentication protocol (EAP); PMK (Pairwise Master Key) that are 60 bits long and are derived from the MSKs; AK (Authenticated Key) derived from PMK at the authenticator; and CMAC_KEY_U and CMAC_KEY_D derived from the AK at the serving BS, may be included in the current context information to be exchanged between the source and target RAT devices.

Other types of security information to be included in the current context to be exchanged between the source and target RAT devices may include, for example, layer three (L3) security context such as WiMAX L3 security parameters. These include, for example, mobile node-home agent (MN-HA) key generated at the MN and the home AAA (HAAA), foreign agent-root key (FA-RK) that is generated at the MN and HAAA and used at the MN/authenticator, MN-FA that is generated by the MN/authenticator and used at the FA/MN, HA-RK that is generated by HAAA and used by the HA/authenticator, and FA-HA that is generated by the HA/authenticator and used by HA/FA. Additionally, during the exchange between the source and target RAT devices, quality of service (QoS) information may be exchanged. Note that the word "exchanged" as used above may refer to the transfer or transmission of information from, for example, the source to the target RAT device.

In various embodiments of the present invention, other types of information may also be exchanged between the source and the target RAT devices. For example, the source RAT device may provide to the target RAT device, the wireless network type of the source network (i.e., RAT type of the source network), the ID of the source BS (i.e., the serving BS in the source network), the source BS IP (Internet Protocol) address, and/or the source AG IP address (IP address of the serving AG in the source network). In contrast, the target RAT device may provide to the source RAT device the wireless network type of the target network, the ID of the target BS, the target BS IP address if known, and/or the target AG IP address.

Figure 2:
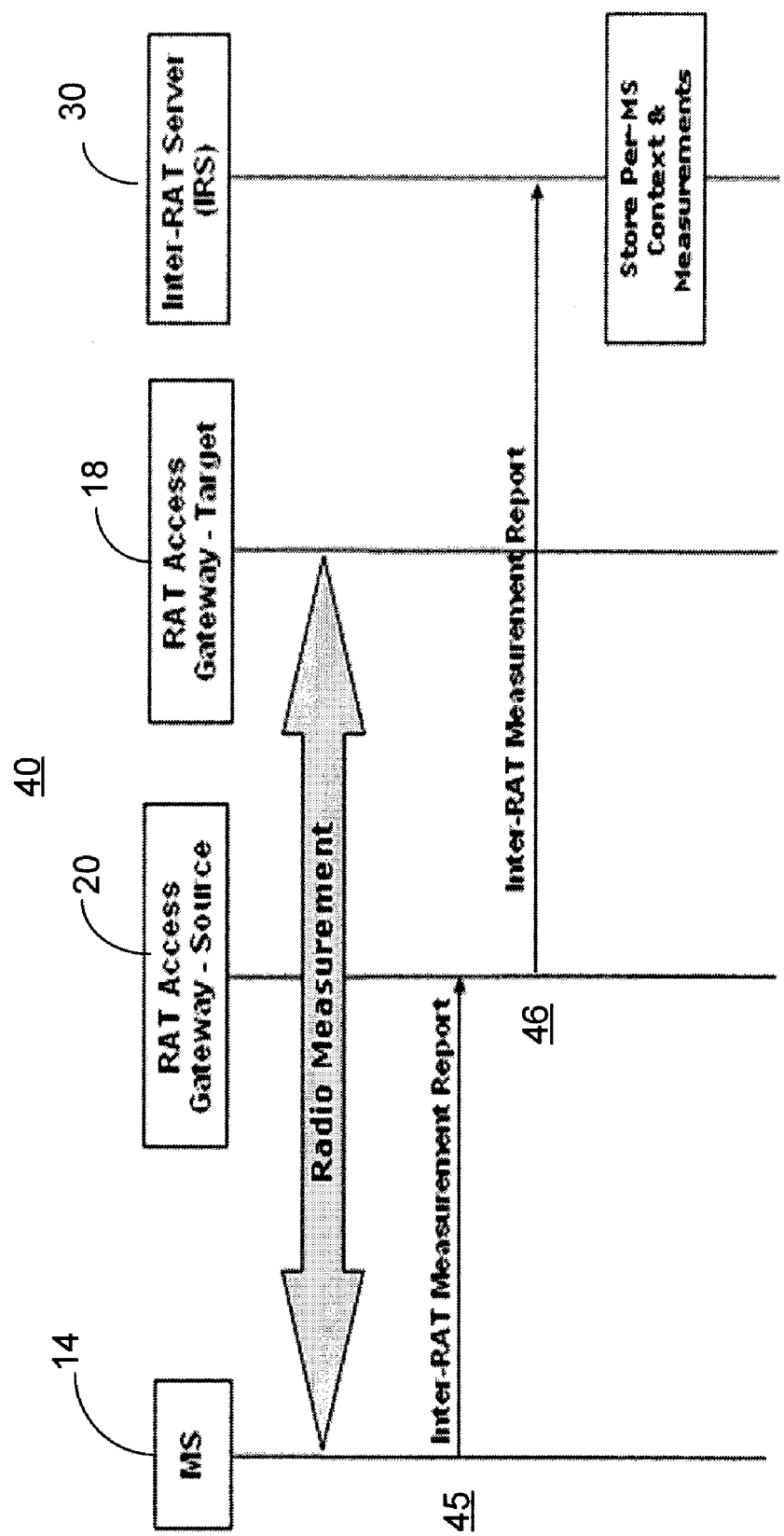
FIG. 2 illustrates a process for reporting the radio measurements of a mobile station to a cross wireless network type inter-RAT server (IRS), in accordance with various embodiments of the present invention.

FIG. 2 illustrates a process for reporting the radio measurements of a mobile station to a cross wireless network type inter-RAT server (IRS) as illustrated by FIG. 1, in accordance with various embodiments of the present invention. For the embodiments, the process 40 may allow the IRS 30 to maintain the most current radio measurements of the MS 14 as well as context information of the MS 14 (or simply "context of the MS 14"). The MS 14 may collect radio measurements and send radio measurement reports (i.e., updates of the radio measurements) to the source AG 20 at 45. The radio measurements collected by MS 14 may include the characteristics of signals received from neighboring base stations including, for example, signal strengths of such signals. The radio measurement reports received by the source AG 20 may then be forwarded to the IRS 30 at 46. Once a radio measurement report is received by the IRS 30, the IRS 30 may store the radio measurements included in the report or may update the radio measurements it already has with the new radio measurements.

Figure 3:
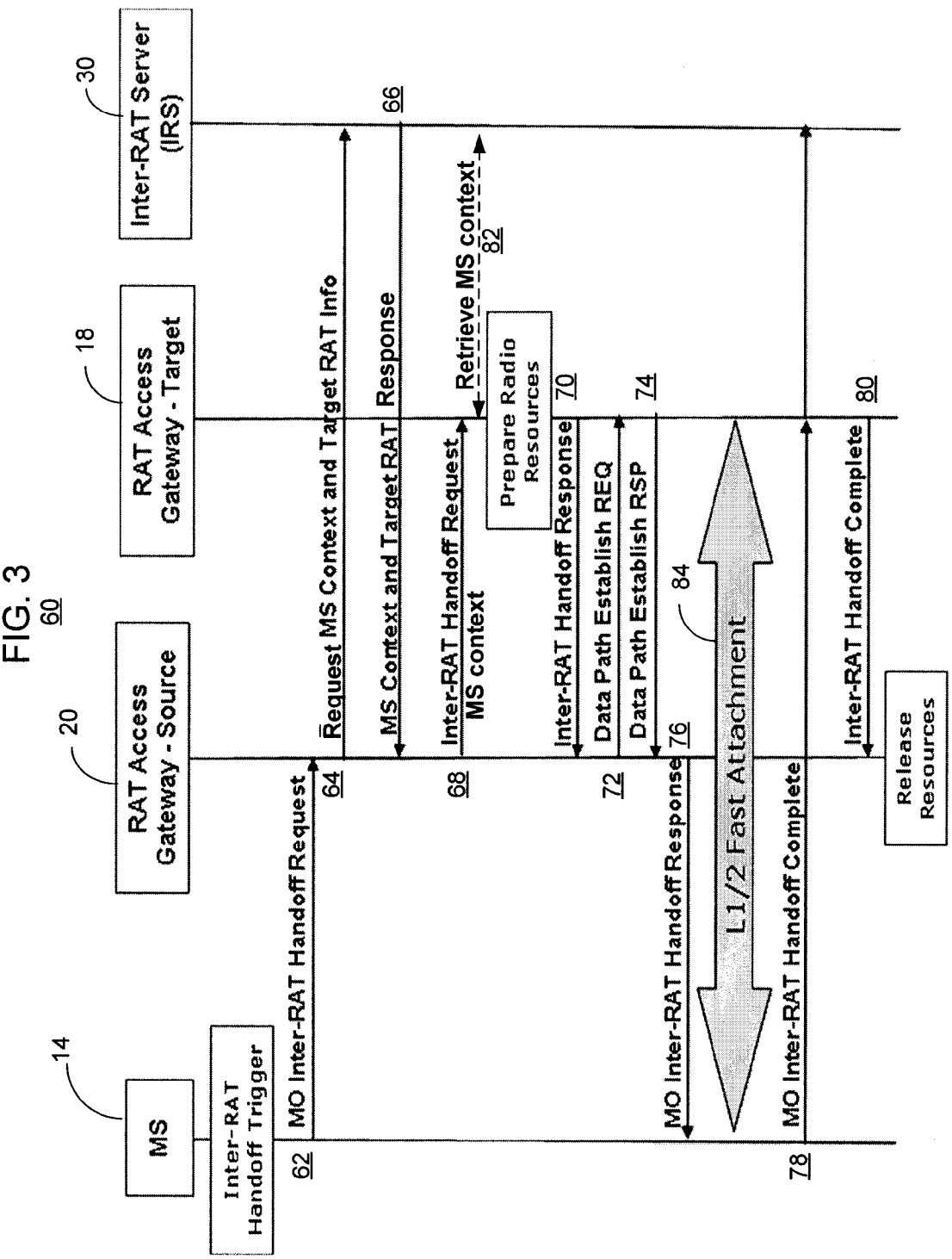
FIG. 3 illustrates a mobile station (MS) initiated process to move the MS from a second wireless network to a first wireless network, in accordance with various embodiments of the present invention.

FIG. 3 illustrates a mobile station (MS) initiated process to move the MS from a second wireless network to a first wireless network as illustrated by FIG. 1, in accordance with various embodiments of the present invention. For the embodiments, the second wireless network is the source wireless network while the first wireless network is the target wireless network. The process 60 may be triggered when the MS 14 sends to the source AG 20 a mobile originated (MO) inter-RAT handoff request to move the MS 14 from the second wireless network to the first wireless network at 62. In other words, to handoff servicing of the MS 14 from the source AG 20 to the target AG 18. After receiving the request, the source AG 20 may retrieve from the IRS 30 various information such as the current context of the MS 14 and information relating to the target wireless network that may further include information about the target AG 18 that may identify the target AG 18. The retrieval of such information may be accomplished by the source AG 20 sending to the IRS 30 a request for MS context and target RAT information (i.e., target wireless network information) to request for current context of the MS 14, target wireless network information, and/or the current radio measurements of the MS 14 at 64.

In response, the IRS 30 may determine and select which of a plurality of AGs of the first wireless network is to be the target AG 18 based on, for example, the current radio measurements of the MS 14. The IRS 30 may then send to the source AG 20, the requested information in the form of an MS context and target RAT response at 66. Such a response may include the current context of the MS as well as information associated with the first wireless network (i.e., target wireless network) including information associated with the target AG (i.e., target AG 18) that may, among other things, identity the target AG 18. Alternatively and as previously described, the IRS 30 may provide the information (e.g., radio measurements of the MS 14) that may be used to identify the target AG 18 from a plurality of AGs in the first wireless network so that the source AG 20 itself can make such an identification. The current context of the MS 14 included in the response may include, among other things, the mobile station's security information, the mobile station's identification in the first wireless network, the mobile station's identification in the second wireless network, layer three security context, and quality of service parameters.

Based on the response provided by the IRS 30, the source AG 20 may determine which of the AGs included in the first wireless network (i.e., target network) will be the target AG 18. After determining the target AG 18, the source AG 20 may send to the target AG 18, an inter-RAT handoff request to handoff servicing of the MS 14 from the source AG 20 to the target AG 18 at 68. In various embodiments, the request may additionally include other information such as current context of the MS 14 and the current radio measurements of the MS 14. Alternatively, the target AG 18 may retrieve such information directly from the IRS 30 as indicated by 82. The retrieval by the target AG 18 of such information may be as a result of the target AG 18 sending a request for such information to the IRS 30, which may then be prompted to provide such information back to the target AG 18.

Based on the information (i.e., current MS context and/or radio measurements of the MS 14) provided by the source AG 20 or directly by the IRS 30, the target AG 18 may prepare its radio resources (e.g., base stations) to provide service to the MS 14 when the MS 14 moves to the target first wireless network. The target AG 18 may then send to the source AG 20 an Inter-RAT handoff response at 70, which is a response to the handoff request (i.e., inter-RAT handoff request at 68) that the target AG 18 received from the source AG 20. The source AG 20, in response, may initiate the establishment of a data path from the target AG 18 to the MS 14. This may be accomplished at least in part by the source AG 20 sending to the target AG 18, a data path establish request at 72. In response, the target AG 18 may facilitate the establishment of the data path and send back to the source AG 20 a data path establish response that may include information that may facilitate in the establishment of the data path at 74.

The source AG 20 may then send to the MS 14 a response to the MO inter-RAT handoff request originally sent by the MS 14 to indicate to the MS 14 that the request has been granted as well as to provide any other information that the MS 14 may need in order to communicate through the target first wireless network including, for example, information needed to establish the data path to the target AG 18 at 76. The MS 14, in response, may send to the target AG 18 an MO inter-RAT handoff completion message to indicate to the AG 18 that the handoff has been completed at 78. This message may then be forwarded to the IRS 30 at 78 as well as to the source AG 20 at 80. The source AG 20 may then release its resources that may have been previously dedicated to the MS 14. As a result of the process 60, the target AG 18 may accept a layer one and/or two (L1 or L2) fast attachment from the MS 14 as indicated by 84. Further, and as a result of the L1 or L2 fast attachment, the MS 14 may move from the source second wireless network 12 to the target first wireless network 10 without any significant delays.

Figure 4:
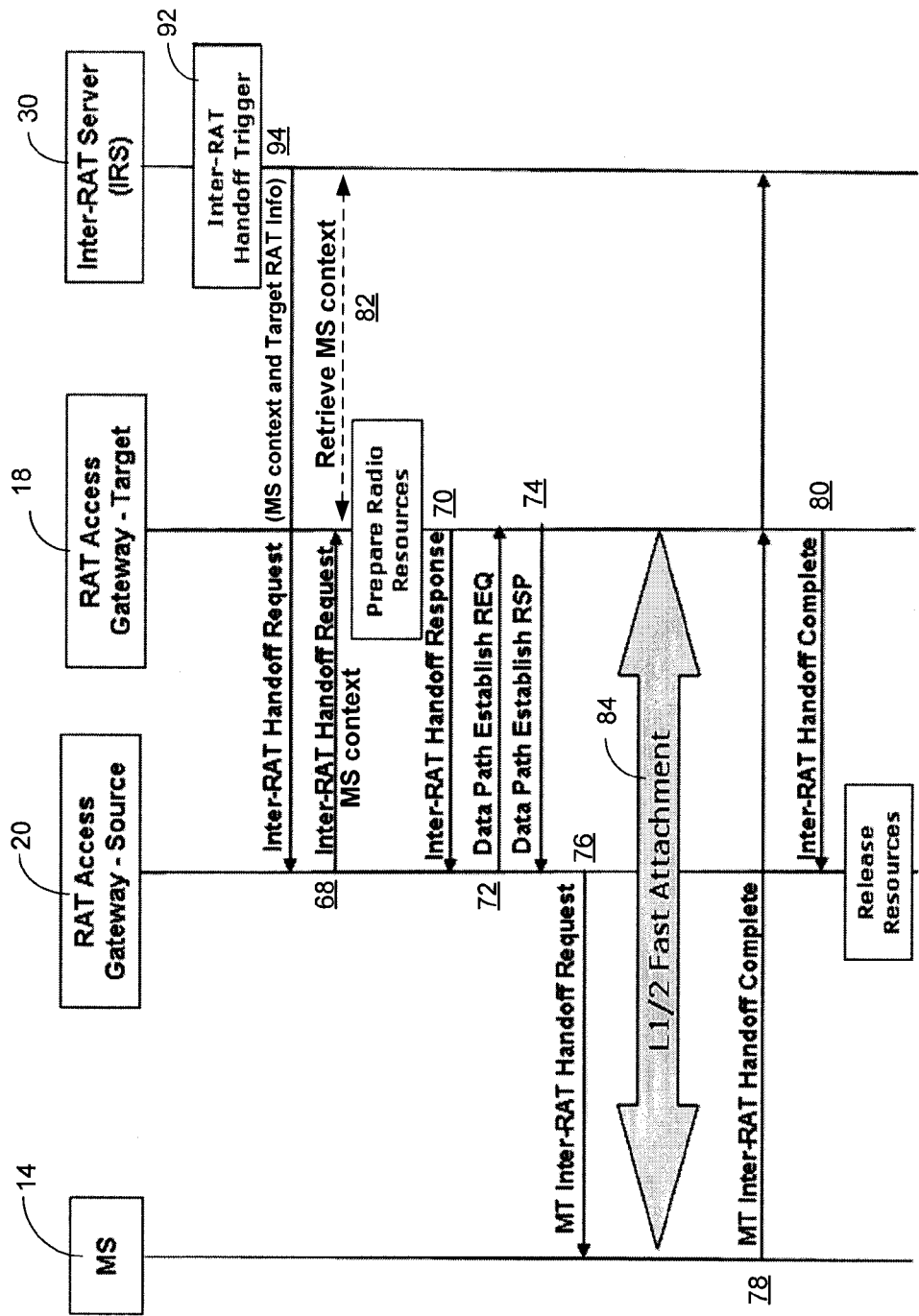
FIG. 4 illustrates an inter-RAT server (IRS) initiated process to move a mobile station (MS) from a second wireless network to a first wireless network, in accordance with various embodiments of the present invention.

Referring now to FIG. 4, which illustrates an inter-RAT server (IRS) initiated process to move a mobile station (MS) from a source wireless network to a target wireless network as illustrated by FIG. 1 in accordance with various embodiments of the present invention. As depicted, the process 90 is very similar with the process 60 of FIG. 3 with a few differences particularly with how the processes 60 and 90 begin. The process 90 may begin when a handoff triggering event occurs as indicated by 92. This triggering event may occur, for example, when the IRS 30 determines that based on the radio measurements reports provided to the IRS 30 by the MS 14 as depicted in process 40 of FIG. 2, the MS 14 should be moved from its current wireless network (i.e., second wireless network 12 of FIG. 1) to another network (i.e., first wireless network 10 of FIG. 1).

As a result of the handoff trigger 92, the IRS 30 may send to the source AG 20 an inter-RAT handoff request requesting to handoff servicing of the MS from the source AG 20 to the target AG 18 at 94. In addition to the request, the IRS 30 may send to the source AG 20, the current context of the MS 14, target wireless network information, and/or the current radio measurements of the MS 14. The other operations depicted in process 90 generally correspond to those depicted in the process 60 of FIG. 3 and therefore, will not be described here. In any event, as a result of the process 90, the target AG 18 may accept a layer one and/or two (L1 or L2) fast attachment from the MS 14 as indicated by 84. Further, as a result of the L1 and/or L2 fast attachment, the MS 14 may move automatically from the source second wireless network to the target first wireless network without any significant delays and without needing to be triggered by the MS 14.

At this point it should be noted that although the processes 40, 60, and 90 depicted in FIGS. 2, 3, and 4 were directed to AGs (i.e., AGs 18 and 20) of different types of wireless networks working collaboratively to move the MS 14 from a second wireless network 12 to a first wireless network 10 as depicted in FIG. 1, these processes 40, 60, and 90 may be implemented using other types of RAT devices such as base stations 22S and 24S. However, if the source and target RAT devices were base stations rather than access gateways, certain aspects of the processes 40, 60, and 90 may change. For example, if the source and target RAT devices were base stations rather than access gateways as in the above illustrations, then in ref. 82 of FIG. 3, the target RAT device would retrieve the current context of the MS 14 indirectly rather than directly from the IRS 30. That is, the current context of the MS 14 will have to be retrieved indirectly from the IRS 30 via the AG 18 (see, for example, FIG. 1). Further, a target RAT device that is a target base station 22 may need to notify the serving AG 18 of the target wireless network to enable the AG 18 to cooperate with the corresponding AG 20 of the source wireless network to facilitate establishment of a data path for the MS 14 to the AG 18 of the target wireless network, and to enable the AG 18 to accept the layer one and/or two fast attachment from the MS 14.

Figure 5:
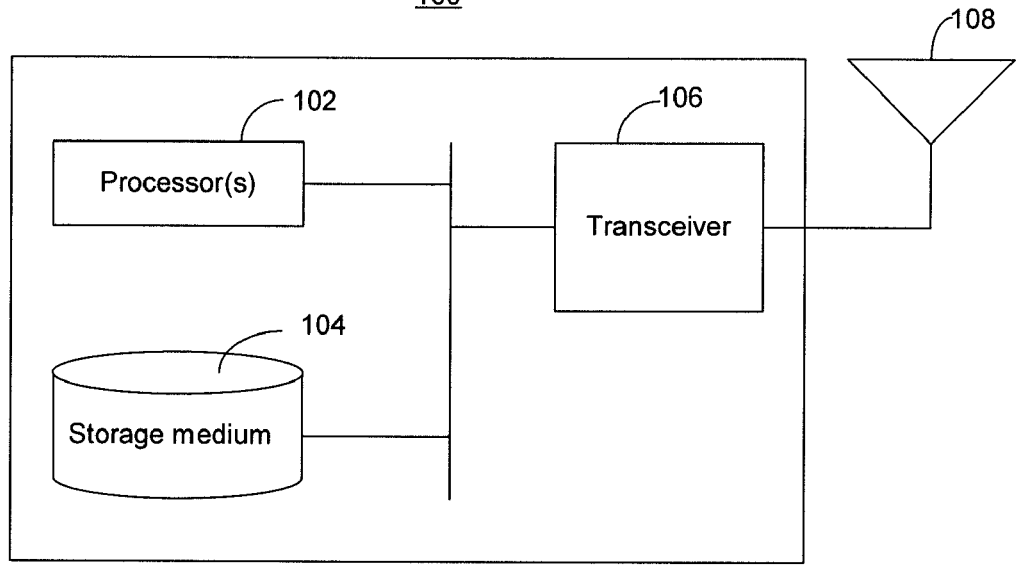
FIG. 5 illustrates an exemplary radio access technology (RAT) device, in accordance with various embodiments of the present invention.

FIG. 5 illustrates an exemplary RAT device in accordance with various embodiments of the present invention. For the embodiments, the RAT device 100 may be a base station (BS) or an access gateway (AG) and may either be a source or a target RAT device. The RAT device may include, among other things, one or more processors 102, a storage medium 104 such as a computer readable storage medium, a transceiver 106, and one or more antennas 108, coupled together as shown. The one or more antennas 108 may be omnidirectional and/or directional antennas. The transceiver 106 along with the one or more antennas 108 may transmit signals to and receive signals from an MS or a BS through at least a second of at least two wireless networks.

The storage medium 104 may be computer readable non-transitory storage medium designed to store programming instructions to be operated by the one or more processors 102 to enable the RAT device 100 to facilitate the MS to move from the second wireless network (i.e., source network) to a first wireless network (i.e., target network) of the at least two wireless networks as described previously (see, for example, the above discussions of FIGS. 1-4). For example, in the case where the RAT device 100 is a source RAT device (either AG or BS), the storage medium 104 may include programming instructions to enable the RAT device 100 to receive a request to move the MS from the second wireless network to the first wireless network, and upon receiving the request send to another RAT device of the first wireless network, a request to handoff servicing of the MS from the RAT device 100 to the other RAT device in the first wireless network.

The programming instructions may further enable the RAT device 100 to receive or obtain a reply from the other RAT device in response to the request to handoff servicing of the MS that indicates acceptance of the request, and to collaborate with the other RAT device in response to the reply to establish a data path between the MS and the other RAT device to facilitate a layer one and/or two fast attachment from the MS to the other RAT device of the first wireless network. The programming instructions may further enable the RAT device 100 to perform the other previously described operations of a source RAT device that may be performed in order to facilitate the MS to move from the second wireless network to the first wireless network.

Figure 6:
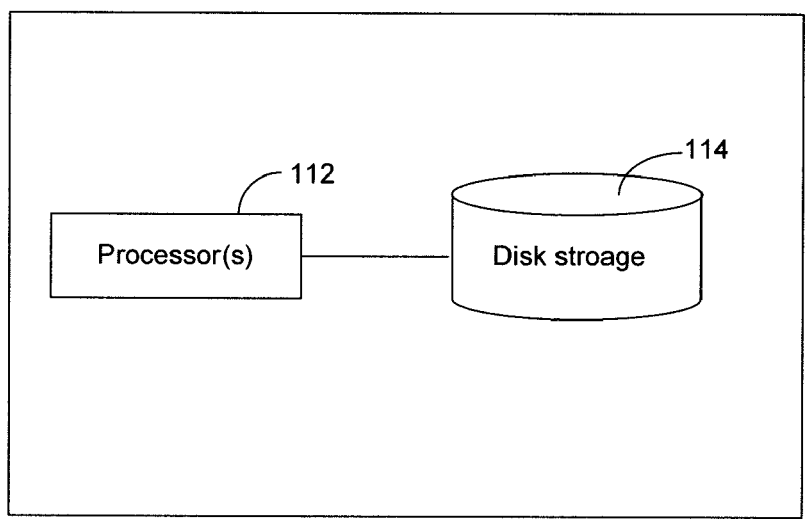
FIG. 6 illustrates an exemplary cross wireless network type inter-RAT server system, in accordance with various embodiments of the present invention.

FIG. 6 illustrates an exemplary cross wireless network type inter-RAT server system (herein "IRS system") in accordance with various embodiments of the present invention. The IRS system 110 may include, among other things, one or more processor(s) 112 and one or more disk storage 114. In various embodiments, the one or more disk storage 114 may be one or more computer readable disk storage. The one or more disk storage 114 may be designed to a plurality of programming instructions to be operated by the one or more processor(s) 112 to enable the IRS system 110 to facilitate a MS to move from a second wireless network of a second wireless network type to a first wireless network of a first wireless network type, the first and second wireless network types being of different network types, as previously described. For example, the one or more disk storage 114 may include programming instructions when operated by the one or more processor(s) 112 that enables the IRS system 110 to receive from a second RAT device of the second wireless network, a request for a current context of the MS, the second RAT device requesting for the current context in response to a request to handoff the MS from the second RAT device to a first RAT device of the first wireless network.

The programming instructions may further enable the IRS system 110 to provide the current context of the MS to the second RAT device to enable the second RAT device to accept the handoff request. The programming instructions may further be adapted to be operated by the one or more processor(s) 112 to enable the IRS system 100 to perform the various IRS operations that may be executed in order to move the MS from the second wireless network to the first wireless network as previously described.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A system, comprising
one or more processors; and
one or more storage media coupled to the one or more processors, and having stored therein a plurality of programming instructions to be operated by the one or more processors to configure the system to facilitate a mobile station (MS) to move from a second wireless network of a second wireless network type to a first wireless network of a first wireless network type, the first and second wireless network types being of different network types, wherein the system is configured to:
receive from a second radio access technology (RAT) device of the second wireless network, a request for a current context of the MS and information associated with the first wireless network, the second RAT device requesting for the current context and information associated with the first wireless network in response to a request to hand off the MS from the second wireless network to the first wireless network;
receive, from the second RAT device, updates of radio measurements of the MS to facilitate the system to maintain current radio measurements of the MS;
select, based on the current radio measurements, a first RAT device from a plurality of RAT devices of the first wireless network;
provide, from a cross wireless network type inter-RAT server in response to said receiving of the request from the second RAT device, the current context of the MS and information associated with the first wireless network, including information associated with the first RAT device, to the second RAT device to enable the second RAT device to accept the handoff request;

receive from the first RAT device of the first wireless network, another request for the current context of the mobile station, the first RAT device requesting for the current context of the MS in response to receiving a request to hand off the MS from the second RAT device to the first RAT device received from the second RAT device; and provide, from the cross wireless network type inter-RAT server, the current context of the MS to the first RAT device to enable the first RAT device to accept the request to handoff, wherein the current context is provided to the first RAT device subsequent to providing the current context to the second RAT device.

2. The system of claim 1, wherein said programming instructions are adapted to be operated by the one or more processors to further configure the system to send to the second RAT device the request to handoff the MS from the second RAT device to the first RAT device based at least in part on the updates.

3. The system of claim 1, wherein the current context of the MS is provided from the server directly to the second RAT device, by bypassing the MS and the first RAT device.

4. The system of claim 1, wherein the current context of the MS is provided from the server directly to the first RAT device, by bypassing the MS and the second RAT device.

5. A method comprising
receiving from a second radio access technology (RAT) device of a second wireless network, a request for a current context of a mobile station (MS) and information associated with a first wireless network, wherein the first and second wireless networks are different network types, the second RAT device requesting the current context and information associated with the first wireless network in response to a request to hand off the MS from the second wireless network to the first wireless network;

receiving, from the second RAT device, updates of radio measurements of the MS to facilitate maintenance of current radio measurements of the MS;

selecting, based on the current radio measurements, a first RAT device from a plurality of RAT devices of the first wireless network;

providing, from a cross wireless network type inter-RAT server in response to said receiving of the request from the second RAT device, the current context of the MS and information associated with the first wireless network, including information associated with the first RAT device, to the second RAT device to enable the second RAT device to accept the handoff request;

receiving from the first RAT device of the first wireless network, another request for the current context of the mobile station, the first RAT device requesting the current context of the MS in response to receiving a request to hand off the MS from the second RAT device to the first RAT device received from the second RAT device; and providing, from the cross wireless network type inter-RAT server, the current context of the MS to the first RAT device to enable the first RAT device to accept the request to handoff, wherein the current context is provided to the first RAT device subsequent to providing the current context to the second RAT device.

6. The method of claim 5, further comprising sending, to the second RAT device, the request to handoff the MS from the second RAT device to the first RAT device based at least in part on the updates.

7. The method of claim 5, wherein said providing the current context of the MS comprises providing the current context from the server directly to the second RAT device, by bypassing the MS and the first RAT device.

8. The method of claim 5, wherein said providing the current context of the MS comprises providing the current context directly to the first RAT device, by bypassing the MS and the second RAT device.

* * * * *